United States Patent [19]
Kline et al.

[11] Patent Number: 5,068,880
[45] Date of Patent: Nov. 26, 1991

[54] OPTICAL INTERCONNECTS IN THE COMPUTER ENVIRONMENT

[75] Inventors: Todd A. Kline, Warminster; Warren A. Rosen, Hartsville; William J. Bermingham, Holland; Eric A. Alfonsi, Newtown Square, all of Pa.

[73] Assignee: The United States of America as represented by the Secretary of the Navy, Washington, D.C.

[21] Appl. No.: 580,043

[22] Filed: Sep. 6, 1990

[51] Int. Cl.$^5$ .............................................. H04L 7/08
[52] U.S. Cl. ................................. 375/116; 370/105.1; 370/106
[58] Field of Search ................ 375/114, 116; 370/106, 370/105.1

[56] References Cited

U.S. PATENT DOCUMENTS 4,298,987 11/1981 Stattel ................................. 375/114
4,984,238 1/1991 Watanabe et al. .................. 370/106

Primary Examiner—Benedict V. Safourek
Assistant Examiner—Temesghen Ghebretinsae
Attorney, Agent, or Firm—James V. Tura; James B. Bechtel; Susan E. Verona

[57] ABSTRACT

A method is provided for decoding an input data stream formed of data words having word boundaries and a synchronization word in a network interface unit of a high speed computer network. The input data stream is applied to a serial-to-parallel shift register to provide parallel boundary determination words for locating a word boundary within the data stream. There no serial shifting of bits within the parallel boundary determination words. The parallel boundary determination words are shifted through a register file in parallel and applied to synchronization word detectors which provide a series of detecting windows shifted from each other by one bit. When one of the word detection windows detects the synchronization word a word boundary is determined in accordance with the detection. Boundary detection data is thus effectively monitored in serial while it is shifted through the register file in parallel. This permits the use of slower and smaller logic in the register file. An encoder is also provided wherein a SYNCH bit pattern is transmitted in the absence of data words. If new data words arrive during transmission of the SYNCH bit pattern, at least a portion of the first data word is stored while the remainder of the SNYCH bit pattern is transmitted. After transmission of the remainder of the SYNCH bit pattern the data word portion is retrieved and transmitted.

13 Claims, 5 Drawing Sheets

OPTICAL INTERCONNECTS IN THE COMPUTER ENVIRONMENT

STATEMENT OF GOVERNMENT INTEREST

The invention described herein may be manufactured and used by or for the government of the United States of America for governmental purposes without the payment of any royalties thereon or therefore.

BACKGROUND OF THE INVENTION

This invention relates to network interface integrated circuits for transferring high speed parallel digital data or commands which may be input at variable rates over a single asynchronous high speed serial data link.

Advanced highly parallel distributed data processing architectures rely increasingly on high speed fiber optic links to interconnect processing elements such as computers, signal processors, and sensors. In the past, to achieve high data rates for such interconnects, many parallel links were required. This resulted in increased power consumption and increased size due to the need for many optical transmitters and receivers. An additional problem with such interconnects was that the various elements of the architecture operated at different data rates making it difficult to implement a universal data link. This difficulty resulted because the receiving end of the link and the clock recovery devices usually could not cover a very extended bandwidth. Additionally, attempts were made to develop high speed interface integrated circuits which multiplexed the parallel data onto a serial data link. However, these integrated circuit multiplexers did not achieve the required speeds. Furthermore, this method required several integrated circuits to perform their function resulting in greater size and power consumption.

It is known in the art to provide chip sets which perform several of the required functions. For example, a chip set has been provided for this purpose by Gazelle. However, this chip set has not achieved data rates sufficient for optical interconnects in a computer environment having advanced signal processing equipment. Furthermore, this chip set requires two chips in order to perform both encoder and decoder functions. The Gazelle chip set has a forty bit wide input data word. Therefore this chip set is less suited to sensor or signal processor applications where size is a very important consideration. A Honeywell chip set provided for this purpose offers both a command mode and a data mode with a limited number of word commands. If both modes are provided in an integrated circuit embodiment a more efficient use of space is permitted. Moreover neither chip set offers both an eight bit mode and a sixteen bit mode.

SUMMARY OF THE INVENTION

A method is provided for decoding an input data stream formed of data words having word boundaries and a synchronization word in a network interface unit of a high speed computer network. The input data stream is applied to a serial-to-parallel shift register to provide parallel boundary determination words for locating a word boundary within the data stream. There is no serial shifting of bits within the parallel boundary determination words. The parallel boundary determination words are shifted through a register file in parallel and simultaneously applied to synchronization word detectors which provide a series of synchronization word detection windows shifted from each other by one bit. When one of the detection windows detects the synchronization word a word boundary is determined in accordance with the detection.

BRIEF DESCRIPTION OF THE DRAWINGS

Other objects, advantages and novel features of the invention will become apparent from the following detailed description of the invention when considered in conjunction with the accompanying drawings wherein.

DETAILED DESCRIPTION OF THE INVENTION

Figure 1A:
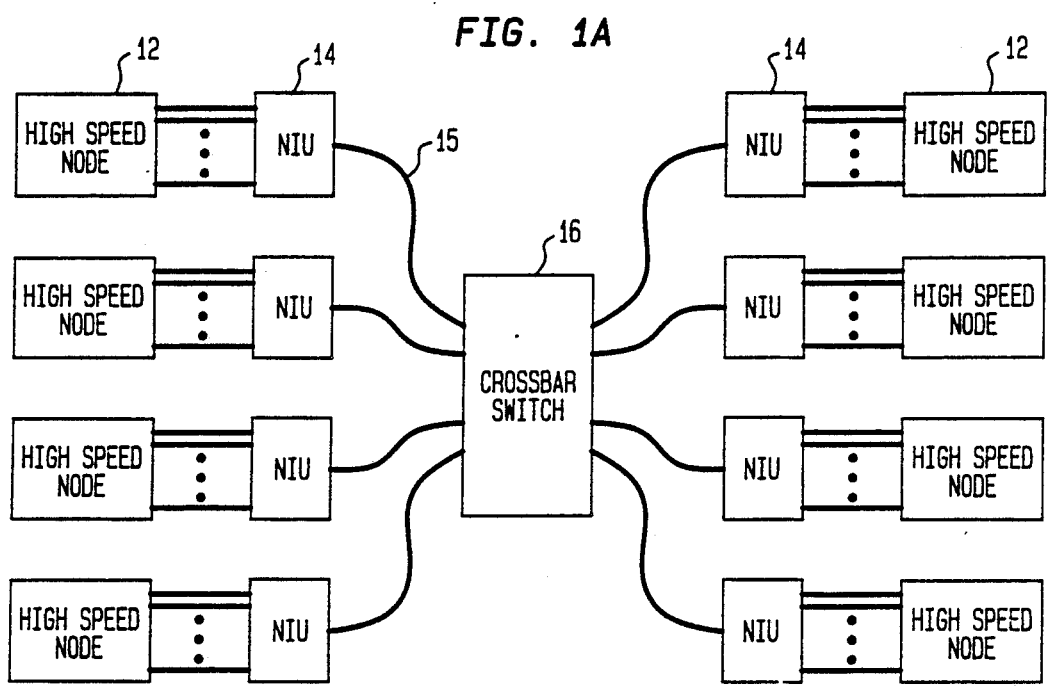
FIG. 1A shows a functional diagram of the high speed switched network using the optical interconnects of the present invention.

Referring now to FIG. 1A, there is shown a functional diagram of high speed switched network 10 of the present invention. High speed switched network 10 includes network crossbar switch 16 as well as a plurality of high speed nodes 12 and network interface units 14. High speed nodes 12 or high speed computers 12 of high speed switched network 10 communicate with each other by way of crossbar switch 16 and network interface units 14.

Figure 1B:
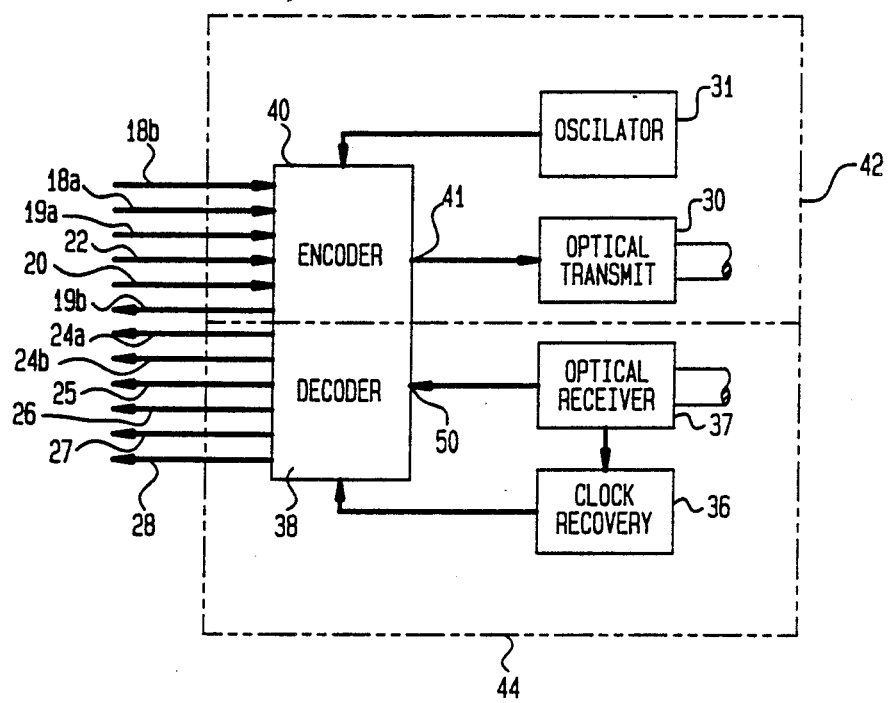
FIG. 1B shows a more detailed representation of a network interface unit within the high speed switched network of FIG. 1A wherein the network interface unit includes the optical interconnects of the present invention.

Referring now to FIG. 1B, there is shown a block diagram representation of network interface unit 14 of high speed switched network 10. Network interface unit 14 of high speed switched network 10 allows bidirectional communication over full duplex, point-to-point links 15 between network interface units 14 and crossbar switch 16. Data can be transmitted by way of point-to-point links 15 at one gigabit per second or any slower rate within switched network 10. Additionally sixteen user-defined commands may be transmitted over point-to-point links 15. Two functional sections 42, 44 are included within network interface unit 14. One of the sections within network interface unit 14 is interface transmitter section 42. Interface transmitter section 42, including transmitter data encoder 40 and clock oscillator 31, transmits data to point-to-point link 15 by way of optical transmitter 30. The other section within network interface unit 14 is interface receiver section 44. Interface receiver section 44 includes receiver data decoder 38. Receiver data decoder 38 receives data from point-to-point link 15 by way of optical receiver 37.

One external host computer 12 of the plurality of high speed computers 12 within network 10 presents parallel data and control signals to the encoding logic of interface transmitter section 42 within network interface unit 14. Transmitter data Encoder 40 can input either eight-bit parallel data words or sixteen-bit parallel data words on data buses 18a,b. Data lines 18a may receive bits zero to seven and data bus 18b may receive data bits eight to fifteen during parallel operation. Thus the low order byte and the high order byte are received by separate parallel data buses 18a,b during sixteen-bit operation of transmitter data encoder 40. Transmitter data encoder 40 of interface transmitter section 42 is configured for the selected data word length by way of data word mode control line 20.

Host computer 12 can input data as either data words or user-defined command words. Command/data control line 22 of transmitter data encoder 40 indicates to encoder 40 what type of information is on data buses 18a,b. Data words are accepted from the host computer using a conventional DATA READY/ACKNOWLEDGE handshake on encoder control lines 19a,b. Data can be transmitted by interface transmitter section 42 at the maximum clock rate of sixty two and one-half megahertz for sixteen-bit words or one hundred twenty five megahertz for eight-bit words. The parallel data word is encoded and converted to a serial stream and transmitted at one gigabit per second. Any rate from host computer 12 less than the maximum is accepted by transmitter data encoder 40 of interface transmitter section 42.

Interface receiver section 44 of network interface unit 14 accepts data from an interface transmitter section 42 of a differing network interface unit 14 by way of optical receiver 37 and presents the correct eight-bit or sixteen-bit words to receiving host computer 12 by way of decoder data lines 24a,b. Command/data control line 26 of interface receiver section 44 indicates to host computer 12 whether the received information is a command or data word. A DATA STROBE signal applied to decoder control line 25 indicates to the host computer when each new word is available. An error signal on decoder control line 28 indicates if information is received incorrectly by interface receiver section 44.

After power-on and after periods with no signal on point-to-point link 15, clock recovery circuitry 36 of interface receiver section 44 must acquire synchronization with the incoming signal received by optical receiver 37. When this happens, interface transmitter section 42 of a transmitting network interface unit 14 sends a unique symbol, called SYNCH, to interface receiver section 44 of the receiving host computer. Different SYNCH symbols allow receiver data decoder 38 to synchronize at the correct eight-bit or sixteen-bit boundary of the received information.

By decoding these SYNCH and data symbols, receiver data decoder 38 may signal receiving host computer 12 of the selection of either the eight-bit word size or the sixteen-bit word size. Additionally receiver data decoder 38 signals receiving host computer 12 whether the command mode or the data mode is selected. Transmitting host computer 12 may transmit at rates less than one gigabit per second, for example in the case of a slow sensor. For this type of host computer 12, interface transmitter section 42 of network interface unit 14 inserts SYNCH symbols when data are not available from host computer 12 at the one gigabit per second rate. In this way clock recovery circuitry 36 of interface receiver section 44 may remain locked to a constant frequency regardless of the rate at which the data is presented to transmitter data encoder 40.

Figure 2:
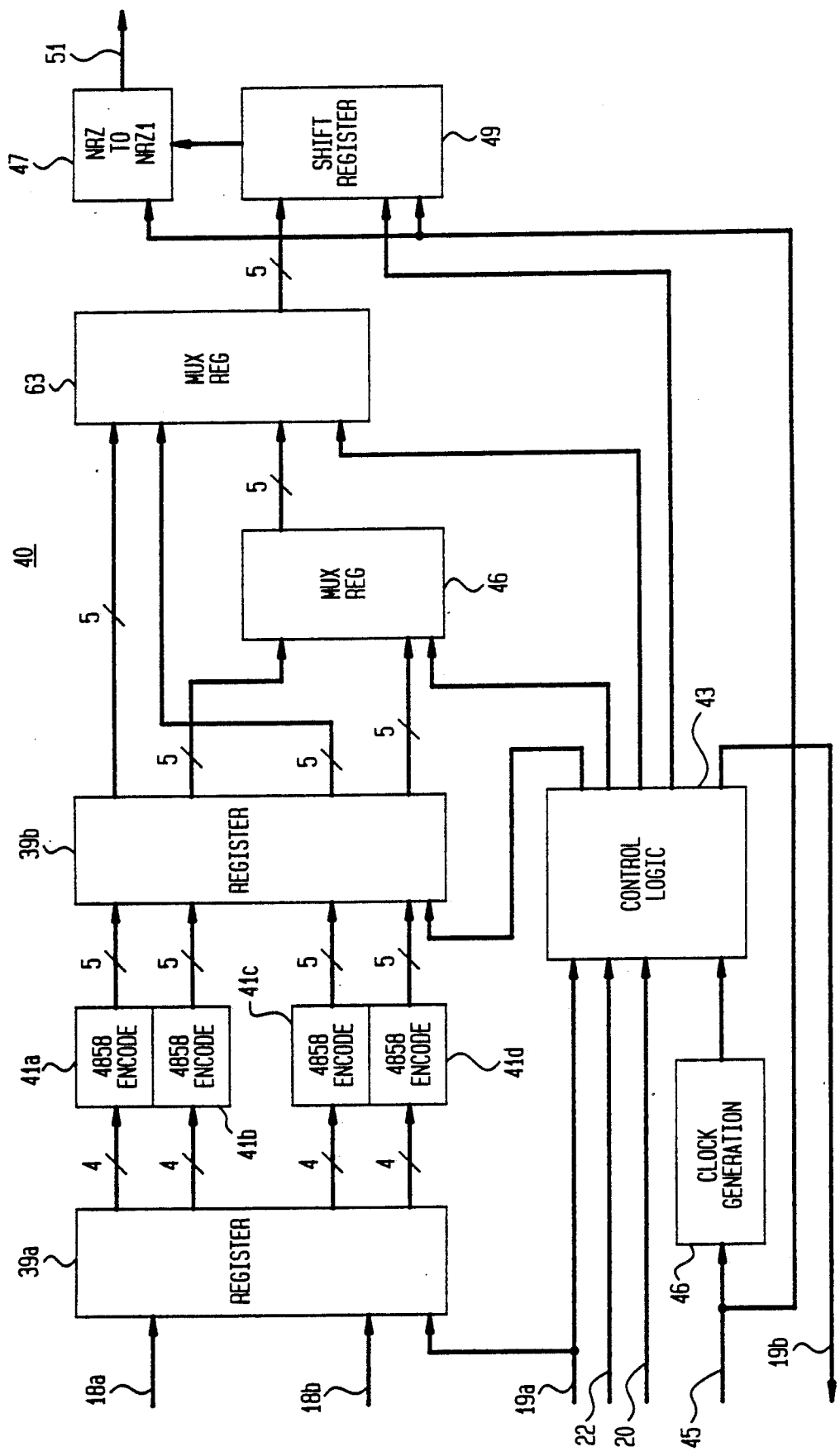
FIG. 2 shows a block diagram representation of the network interface chip encoder section of the network interface unit of FIG. 1B.

Referring now to FIG. 2, there is shown a more detailed block diagram of transmitter data encoder 40 within interface transmitter section 42 of network interface unit 14. The internal operation of network interface unit 14 and the operations of the serial transfers over point-to-point links 15 are transparent to a user. Within transmitter data encoder 40 the parallel data are clocked by way of data input buses 18a,b into internal encoder input register 39a. When the data are thus stored in internal encoder input register 39a, b and the DATA READY signal of encoder control line 19a is detected by encoder control logic 43 within transmitter data encoder 40, an ACKNOWLEDGE signal is returned to the user by way of encoder control line 19b. The input of transmitter data encoder 40 is double-buffered using internal encoder input register 39b to permit access to internal input registers 39a,b within transmitter data encoder 40 for loading data for the following cycle while data for the current cycle are being encoded by transmitter data encoder 40.

Within transmitter data encoder 40, a 4B5B encoding scheme is used to encode the data in 4B5B encoders 41a–d. In this 4B5B encoding scheme, a four bit nibble is encoded into a five-bit symbol. In order to transfer input data from host computer 12 at one gigabit per second, the five-bit symbols from 4B5B encoders 41a–d must be transmitted at a one and one-quarter gigabit per second rate. In the resulting five-bit code, thirty-two symbols are possible. Sixteen of these thirty-two symbols are used for data and several others are dedicated for commands and maintaining synchronization of interface receiver section 44 with incoming data. The remaining symbols are not allowed. Limiting the number of valid five-bit symbols in the encoding scheme has several advantages. These advantages include ensuring a minimum number of transitions for each five-bit symbol, limiting the run-length between transitions, and minimizing the DC component in the serial data stream transmitted by way of serial data line 51. In this way pulse width distortion due to DC drift is minimized in interface receiver section 44. To further minimize the DC component, the non-return to zero (NRZ) data is converted to invert-on-one (NRZI) before being transmitted by interface transmitter section 42.

Within transmitter data encoder 40, either two four-bit nibbles or four four-bit nibbles are encoded in parallel, depending respectively on whether the network interface unit 14 is operating in the eight-bit mode or the sixteen-bit mode as indicated by encoder mode control line 20. Two four-bit nibbles of input data are encoded by 4B5B encoders 41a,b when the eight bit mode of network interface unit 14 is selected. Two additional four-bit nibbles are encoded by 4B5B encoders 41c,d when the sixteen-bit mode is selected. Each symbol is converted from parallel to serial within shift register 49 and further encoded by NRZ to NRZI encoder box 47.

The cycle time signal of clock line 45, eight hundred picoseconds, is applied to clock generator 46. Ten clock cycles of this time duration are needed to transmit two five-bit symbols. Therefore, each encoded data word takes eight nanoseconds to transmit by way of transmitter data encoder 40. Encoder control logic 43 operates at twice this speed with a four nanosecond cycle time. This is a speed of two hundred and fifty megahertz. Since the user interface to transmitter data encoder 40 is asynchronous, by running the control logic at twice the eight-bit data rate and thereby double sampling, transmitter data encoder 40 is assured of never missing any data words input from host computer 12. Every four nanoseconds, a pulse is generated to load five data bits into shift register 49 for transmission to point-to-point link 15.

As previously described, if no user data is present at the input of transmitter data encoder 40, a SYNCH symbol is transmitted instead. The SYNCH symbol is transmitted until new data is applied to the input of transmitter data encoder 40 for transmission. If the new data is applied while transmitter data encoder 40 is in the process of transmitting a SYNCH symbol, transmitter data decoder 40 delays the transmission of the new data and finishes the transmission of the current SYNCH symbol before beginning the transmission of the new data. This is performed by applying the data to multiplexer register 46 which applies a selected five-bit word to multiplexer register 63 in accordance with a control signal from control logic 43.

The internal logic of 4B5B encoders 41a–d runs at the same speed as encoder logic control 43. It therefore takes four nanoseconds to encode user data into valid 4B5B code symbols within 4B5B encoders 41a–d. Thus if a DATA READY pulse on decoder control line 19a just misses a parallel load pulse, the use data can still be encoded in time to catch the next load pulse.

Output shift register 49 of transmitter data encoder 40 is implemented in Source Coupled FET Logic (SCFL logic). SCFL logic is large and has high current requirements and will be discussed in more detail below. Therefore in the preferred embodiment of transmitter data encoder 40, output shift register 49 is only five bits wide, rather than the ten bits necessary to load a complete SYNCH character. This saves space and power within transmitter data encoder 40. However, it presents a timing problem with respect to user data. The problem arises because the first half of a SYNCH character must be followed by the second half during data transmission before any user data may be transmitted by interface transmitter section 42.

If input register 39a is in the eight-bit mode and operating at the maximum rate of one-tenth the rate of clock line 45, there are ten pulses on clock line 45 for each pulse on line 19a. Control logic 43 operates at one-fifth the rate of clock line 45, or twice the maximum rate of input register 39a. This maximum rate is the control cycle length. On every control cycle, line 19a is examined by control logic 43 to determine whether new user data is present within input register 39a. Also, during every control cycle, a five-bit data symbol, or one half of a SYNCH character, is loaded into multiplexer register 63 for a transfer to shift register 49 during the next control cycle.

Table 1 shows one possible transmission pattern. In this transmission pattern it is assumed that the user has just started sending data after some number of SYNCH characters. The bottom row of Table 1 represents the actual data placed on serial output line 51 by NRZ-to-NRZI connector 47. The other rows of Table 1 represent the contents of registers 39a,b and multiplexer registers 46, 63. In Table 1, dnb,a represents an eight-bit data word where n takes the values from one to three. Dnb,a represents a ten-bit encoded data word wherein n may take the values from one to three. Dnb and Dna are five-bit data symbols wherein n again, may take the values from one to three. J and K are five-bit symbols used to form the ten-bit SYNCH character. Table 1 shows that by the time more data is entered during cycle n+2, the old data in register 39b has already been loaded into multiplexer register 63 and transmitted by way of serial output line 51.

TABLE 1

| Control Cycle: | n | n + 1 | n + 2 | n + 3 | n + 4 | n + 5 |
|---|---|---|---|---|---|---|
| Load 39a | d1b,a | — | d2b,a | — | d3b,a | — |
| Load 39b | D1b,a | — | D2b,a | — | D3b,a | — |
| Load 46 | — | D1b | — | D2b | — | D3b |
| Load 63 | J | D1a | D1b | D2a | D2b | D3a |
| Load 49 | K | J | D1a | D1b | D2a | D2b |

Referring now to Table 2, data D1b has not yet been loaded into multiplexer register 63 when D2a,b is loaded into register 39b. If D1b had not been saved in multiplexer register 46 in the previous cycle, it would be lost. Thus, by adding multiplexer register 46 to the data path from register 39b to output shift register 49, and making control of transmitter data encoder 40 somewhat more complex, the amount of SCFL logic used in shift register 49 is reduced by fifty percent. Because multiplexer shift register 46 saves D1b and shift register 49 can be five bits worth of SCFL logic rather than ten, significant power and size enhancements are realized in the preferred embodiment of transmitter receiver encoder 40.

TABLE 2

| Control Cycle: | n | n + 1 | n + 2 | n + 3 | n + 4 | n + 5 |
|---|---|---|---|---|---|---|
| Load 39a | d1b,a | — | d2b,a | — | d3b,a | — |
| Load 39b | D1b,a | — | D2b,a | — | D3b,a | — |
| Load X | — | D1b | — | D2b | — | D3b |
| Load Q | K | J | D1a | D1b | D2a | D2b |
| Load 49 | J | K | J | D1a | D1b | D2a |

Figure 3:
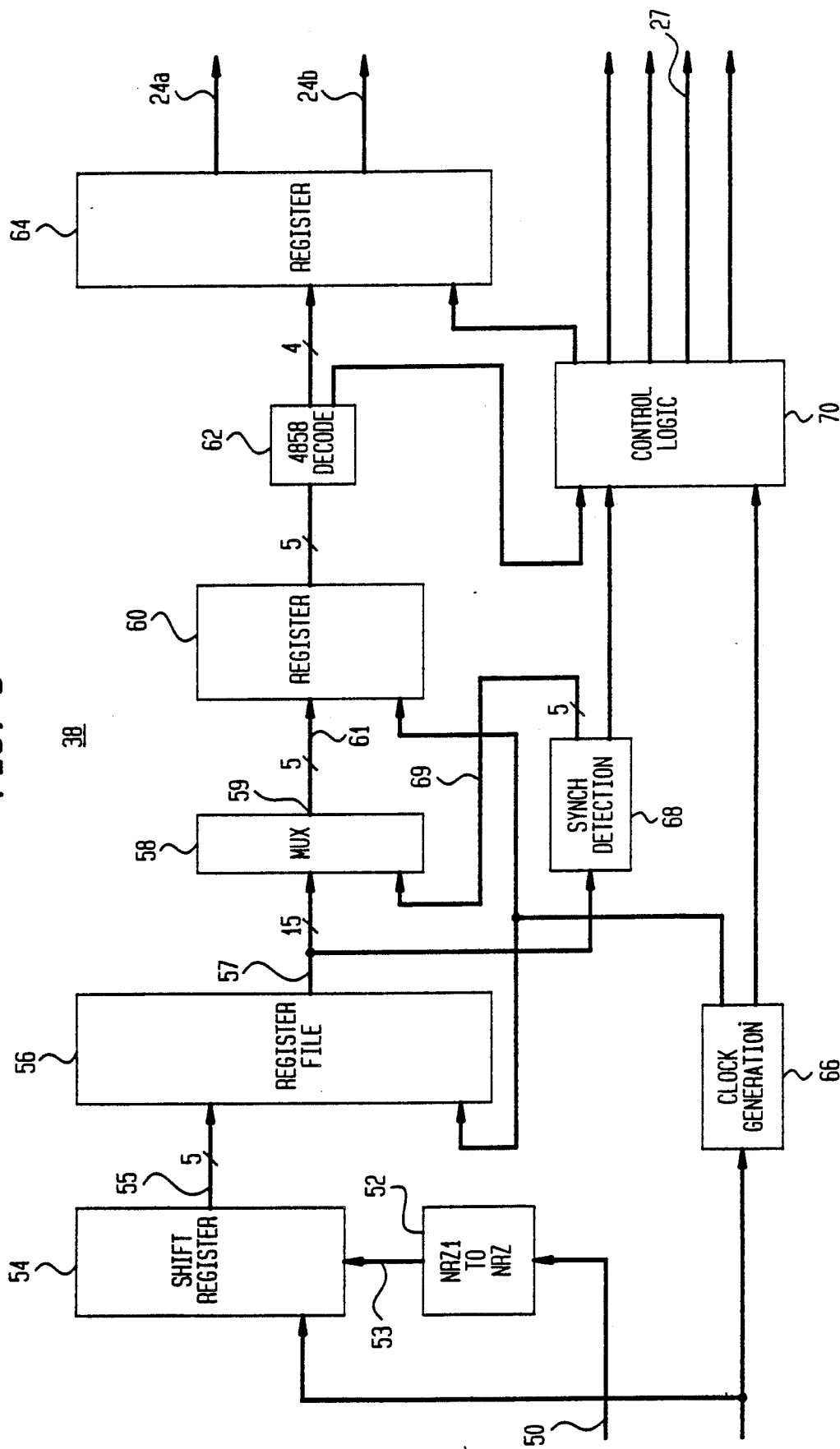
FIG. 3 shows a block diagram representation of the network interface chip decoder section of the network interface unit of FIG. 1B.

Referring now to FIG. 3, there is shown a more detailed block diagram representation of receiver data decoder 38 of interface receiver section 44. Within interface receiver section 44, the clock information embedded in the incoming data stream of decoder input line 50 is extracted by clock recovery circuitry 36 using conventional clock recovery techniques. The extracted clock information is used to generate a synchronized clock signal for receiver data decoder 38. The incoming data on decoder input line 50 is converted from NRZI to NRZ by NRZI-to-NRZ converter 52 and clocked into five bit serial-to-parallel decoder input shift register 54.

Every four nanoseconds, the five serial bits which have been shifted into decoder input shift register 54 are clocked into five-bit wide by three-word deep register file 56 for a determination of the boundaries of adjacent data words within the serial input data stream. Register file 56 therefore contains fifteen bits which are shifted through register file 56 as three five-bit boundary determination words. Thus register file 56 allows the testing of a relatively large portion of the serial bit stream of decoder input line 50 from optical receive 37 at the same time in order to facilitate the finding of word boundaries within the input data stream by receiver data decoder 38. Even though this method therefore requires a larger number gates, it permits the use of slower gates. In GaAs technology the slower gates are smaller thereby allowing receiver data decoder 38 to be smaller.

Each SYNCH symbol is composed of two five-bit words. There are therefore five possible positions in which the SYNCH symbol can occur within register file 56 depending upon where within register file 56 the first bit lies. SYNCH detection logic 68 searches the fifteen bits within register file 56 to locate the relative position of the SYNCH symbols within the serial bit stream. SYNCH detection logic 68 also controls five port multiplexer 58 by way of control line 69 to select the proper word boundary. SYNCH detection logic 68 also sets control flip-flops within decoder control logic 70 to signal either the eight-bit mode or the sixteen-bit mode by way of decoder control line 27.

Figure 4A:
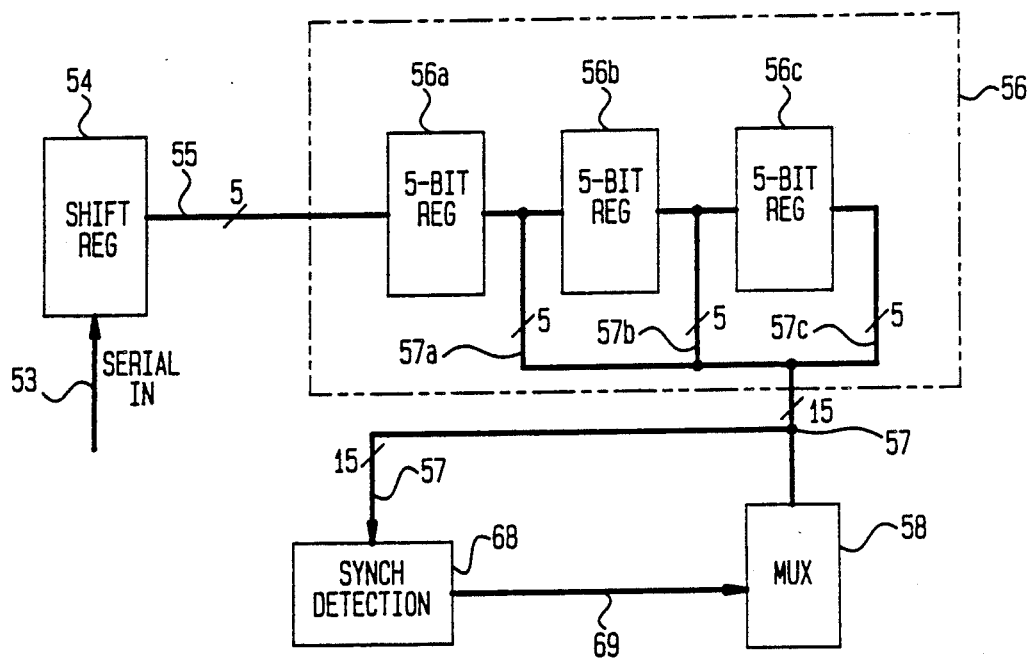
FIGS. 4a,b show more detailed block diagram representations of the register file of the interface chip decoder section of FIG. 3.
Figure 4B:
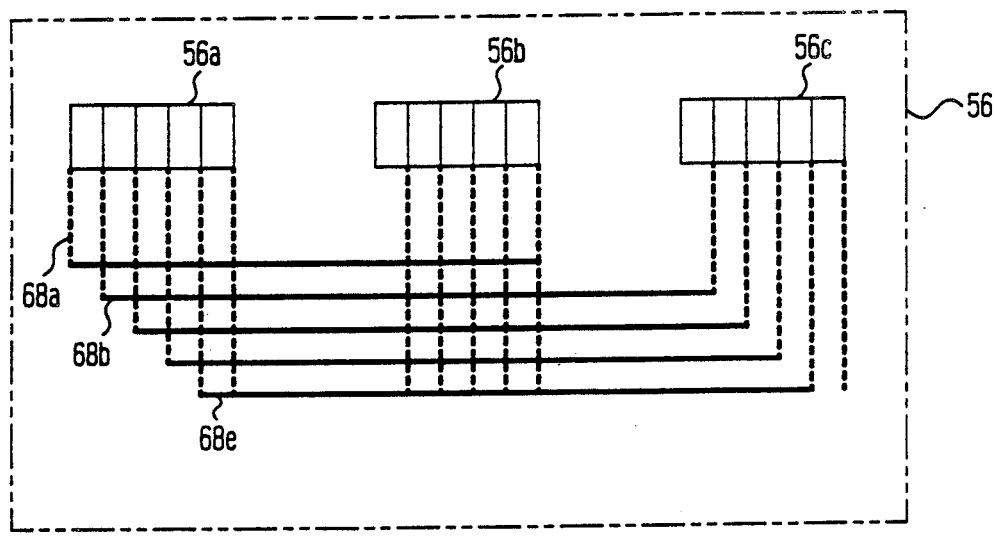

Referring now to FIGS. 4a,b, more detailed representations of register file 56 are shown. Within register file 56 three five-bit registers 56a,b,c are provided. Each register 56a,b,c contains a parallel boundary detection word for use by receiver data decoder 38 in determining the word boundaries of the imput data stream after a period during which the SYNCH bit pattern is transmitted by receiver data decoder 38 of a different node 12 within high speed switched network 10. Five bit data buses 57a,b,c of five-bit registers 56a,b,c are joined end-to-end to form fifteen-bit data bus 57 for applying the concatenated boundary detection word to multiplexer 58 and SYNCH detection 68. SYNCH detection 68 contains five sets of gates (not shown). Each set of gates in SYNCH detection 68 is ten bits wide and is adapted to recognize the same unique SYNCH bit pattern.

Thus five ten-bit synchronization word detection windows 68a–e ar provided within SYNCH detection 68 for detecting the ten-bit SYNCH pattern within the fifteen bits being shifted through register file 56 in parallel as three five-bit boundary detection words. The five ten-bit synchronization word detection windows 68a–e thus provided within SYNCH detection 68 monitor the five possible positions which a ten-bit SYNCH word may occupy within register file 56. Thus each successive synchronization word detection window 68a–e is shifted one bit with respect to another detection window 68a–e. Five-bit output buses 57a,b,c of each of the three registers 56a,b,c within register file 56 containing the boundary detection words are applied end to end to the five sets of gates in SYNCH detection 68. This method provides a virtual serial detection scheme while permitting parallel shifting of the boundary detection data, allowing the use of slower and smaller circuitry.

When one of the five sets of gates in SYNCH detection 68 determines the presence of the SYNCH bit pattern in one of the five possible positions within register file 56, it signals multiplexer 58 to apply a selected five-bit word having correct word boundaries to register 60 by way of five-bit bus 61. SYNCH detection 68 signals multiplexer 58 which channel within bus 57 to select by way of five-bit bus 69 in accordance with which of the five synchronization word detection windows 68a–e determines that the SYNCH bit pattern is present. Thus, multiplexer 58 applies to register 60 one of several possible five-bit words within the single concatenated boundary detection word applied to multiplexer 58 by way of fifteen-bit bus 57. Which five-bit word is selected from bus 57 by multiplexer 58 is determined according to the signal applied to multiplexer 58 by way of bus 69. Multiplexer 58 then remains locked on the channel corresponding to the selected five-bit word. Thus, while SYNCH detection 68 determines synchronization of receiver data decoder 38, multiplexer 58 maintains the synchronization.

SYNCH detection may be performed using the serial bit stream of decoder input line 50. However, use of the serial bit stream requires a large number of very high speed high power Source Coupled FET Logic (SCFL) cells. SCFL cells are considerably larger and consume more power than conventional lower speed cells. Thus, even though the parallel SYNCH detect method of the present invention uses more logic gates, it consumes less power and is smaller than a corresponding serial SYNCH detection method. The parallel SYNCH detection method of the present invention increases the pipeline depth of boundary determination data and permits the fifteen bits of the parallel boundary determination words used for SYNCH detection to be available to SYNCH detection 68 for a long period of time. During this long period of time relatively slow circuitry may be used within register file 56 because the boundary determination data is shifted as parallel words rather than as a serial data stream while the three parallel boundary determination words are applied to SYNCH detection 68 as a single concatenated boundary detection word by bus 57. The additional eight nanoseconds required for the method of the present invention is small compared to the propagation time between high speed nodes 12 of high speed switched network 10.

Once output port 59 of multiplexer 58 is set to the proper word boundary, one five-bit symbol is decoded into the original four-bit nibble per four nanosecond control cycle within 4B5B decoder 62. If the bits received by way of decoder input line 50 are not a valid SYNCH symbol, they are assumed to be data. At this time a test for invalid symbols is performed by decoder control logic 70. Any invalid symbols detected by decoder control logic 70 are reported to host computer 12. Valid data are packed into either eight-bit or sixteen-bit words within register 64 depending on the mode as indicated on line 27. The data words are then strobed into receiving host computer 12 by way of decoder data output lines 24a,b. The correct status for a command word or data word is also presented to host computer 12.

Figure 5:
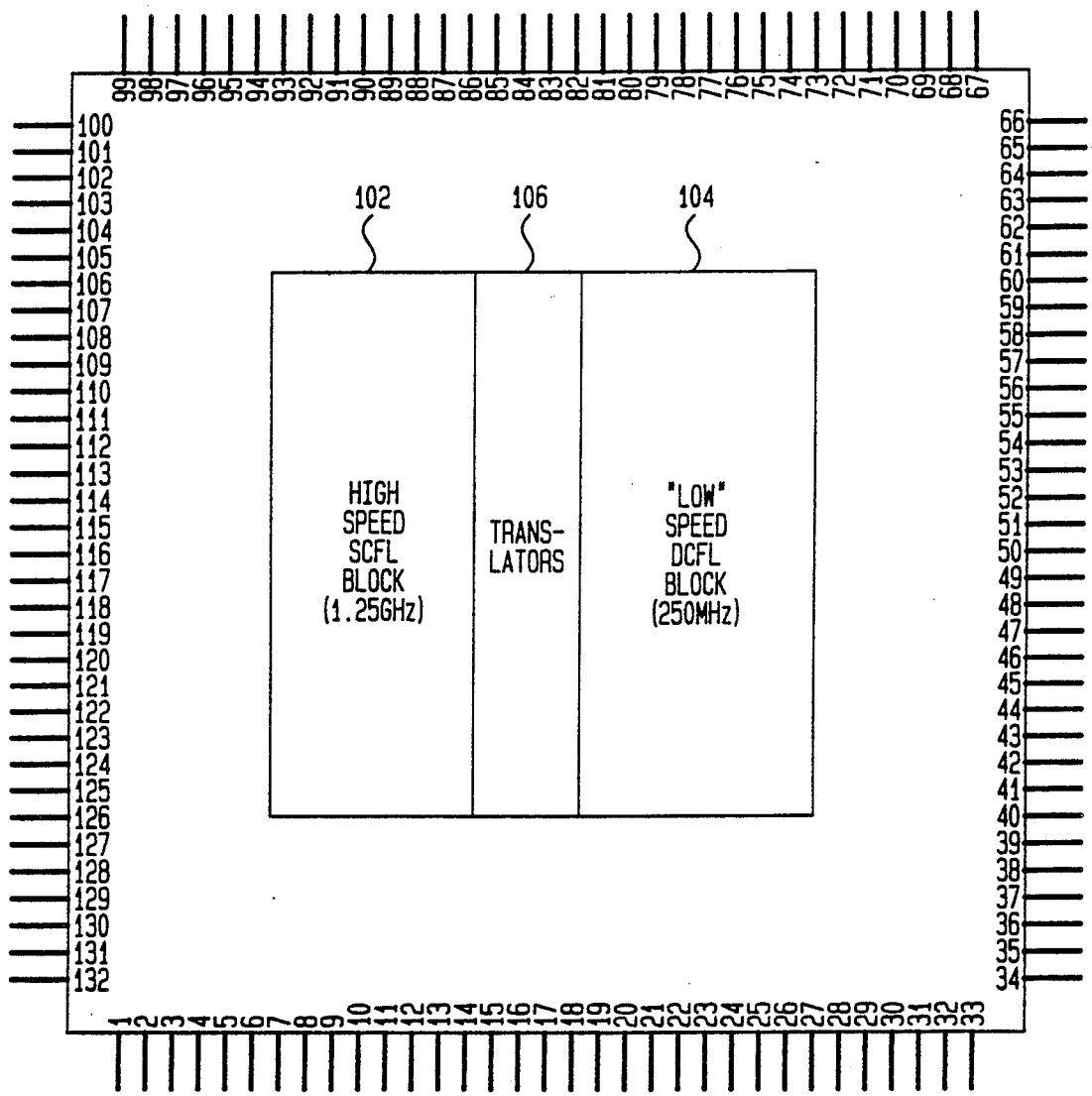
FIG. 5 shows a plan view representation of an integrate circuit embodiment of the network interface unit of FIG. 1B.

Referring now to FIG. 5, there is shown a plan view of integrated circuit 100. Integrated circuit 100 is the preferred embodiment of receiver data decoder 38 and transmitter data encoder 40 of network interface unit 14 of high speed switched network 10. The logic of receiver data decoder 38 and transmitter data encoder 40 of network interface unit 14 are preferably implemented in a gallium arsenide (GaAs) application specific integrated circuit (ASIC) such as integrated circuit 100 using the Vitesse Semiconductor VCB 50K Standard Cell Product. Both receiver data decoder 38 and transmitter data encoder 40 may be implemented on the same GaAs die. Packaged one-hundred thirty-two pin integrated circuit 100 for implementing receiver data decoder 38 and transmitter data encoder 40 network interface unit 14 may have dimensions of approximately one-inch by approximately one-inch by approximately one-tenth of an inch. Integrated circuit 100 may have a nominal power consumption of three and one-third watts to five watts. While the internal logic of network interface unit 14 implemented within integrated circuit 100 may operate at GaAs levels, ECL compatible interface logic may also be provided to interface integrated circuit 100 with other elements of high speed switched network 10.

Receiver data decoder 38 and transmitter data encoder 40 share the common feature of handling high speed parallel data as well as very high speed serial data. They must therefore convert between serial and parallel data formats. Because power consumption is strongly influenced by operating frequency, it is desirable to limit the number of very high speed signals within network interface unit 14. There are two types of logic cells in the Vitesse standard cell library. As previously described, there is the very fast, high power source coupled FET logic (SCFL). Additionally, fast, low power direct coupled FET logic (DCFL) cells are available. Integrated circuit 100 provides physical locations for SCFL region 102, DCFL region 104, and translator region 106. The very high speed lines (not shown) of integrated circuit 100 are located near SCFL block 102. Network interface unit 14 may thus be formed of integrated circuit 100 along with optical input and output circuitry as well as a clock.

The high power SCFL cells of SCFL block 102 can operate at toggle rates up to approximately three and one-third gigahertz. They are best suited for implementing the serial logic of network interface unit 14. The low power DCFL cells of DCFL block 104, which toggle at speeds up to six hundred fifty megahertz, can be used for parallel logic. The SCFL logic cells consume anywhere from approximately nine to approximately fifty times the power of the slower DCFL logic depending upon which cells are compared.

It should be noted that only part of the difference in power consumption between the two types of logic is due to the frequency of operation. The SCFL cells have a structure similar to bipoplar ECL and therefore use more transistors than NMOS-like low power cells. As a result, the very fast cells not only consume more power, they also tend to occupy two to five times the area of an equivalent low power cell. As in some forms of very fast bipolar ECL logic, the high power cells use differential signal lines while the low power cells are single ended. The high power cells are also much less sensitive to fan out than the low power cells. Because of power/size considerations for both receiver data decoder 38 and transmitter data encoder 40, only serial shift register 54, state machine clock generation circuitry 66, NRZ-to-NRZI converter 47, NRZI-to-NRZ converter 52, and clock generator 46, may use the high power logic.

The problem of testing network interface unit 14 as embodied in integrated circuit 100 is complicated by the fact that since the data word is encoded, the presence of a bad bit results in corruption of the entire word. This means that the concept of bit error rate is difficult to define and more difficult to measure. Moreover, the NRZ/NRZI conversion within network interface unit 14 further complicates the testing problem. This is because each NRZI data bit really defines a bit boundary in the original NRZ Data. Thus if one NRZI bit is in error, two NRZ bits are corrupted when the NRZI stream is decoded by transmitter data decoder 40 of interface transmitter section 42. If these two corrupted bits straddle the boundary between two NRZ words, both NRZ words may be corrupted.

Thus it is believed that the word error rate is an appropriate error measurement for testing network interface unit 14 as embodied in integrated circuit 100. The word error rate of integrated circuit 100 may be measured using a custom test fixture (not shown). The custom test fixture may consist of a test computer (not shown) and a high speed memory board (not shown). At the start of a test sequence, the test computer (not shown) loads a pseudo-random bit pattern into one bank of memory. The pseudo-random data is clocked out as either eight bit words or sixteen bit words at one hundred twenty five megahertz or sixty two and one half megahertz respectively. The pseudo-random data is transmitted through integrated circuit 100, and collected in a second bank of memory. The contents of the two memories are then compared to locate any errors. The number and nature of any errors are recorded and the sequence is repeated until sufficient data is obtained to achieve statistical significance.

Integrated circuit 100 within network interface unit 14 provides full duplex bidirectional communications with a DATA READY/ACKNOWLEDGE handshake by way of control lines 19a,b of transmitter data encoder 40. Network interface unit 14 may achieve a data rate of one gigabit per second throughout in a single low profile, low power chip, such as integrated circuit 100, suitable for use in such standard packaging forms as SEM-Ê modules. Any input rate up to the maximum may be transmitted by network interface unit 14. Network interface unit 14 also offers such advantages as selectable eight bit word size or sixteen-bit word size modes, selectable command mode or data mode.

It will be understood by those skilled in the art that over short distances, interface transmitter section 42, interface receiver section 44, and point-to-point fiber link 15 may be replaced with electrical line drivers (not shown), electrical receivers (not shown) and coaxial cable (not shown).

Many modifications and variations of the present invention are possible in view of the above disclosure. It is therefore to be understood, that within the scope of the appended claims, the invention may be practiced otherwise than as specifically described.

We claim:

1. A method for decoding an input data stream formed of a plurality of received data words having a transmitted word boundary between adjacent data words and at least one synchronization word in a network interface unit of a high speed computer network, comprising the steps of:
   (a) applying said input data stream to serial-two-parallel shift means to provide a plurality of parallel boundary determination words;
   (b) applying said plurality of parallel boundary determination words to a plurality of synchronization word detectors wherein said synchronization word detectors provide respective synchronization word detection windows for receiving differing portions of said plurality of parallel boundary determination words to test said different portions for the presence of said synchronization word;
   (c) detecting said synchronization word with the determined one of said synchronization word detection windows;
   (d) determining said transmitted word boundary between said adjacent words of said input data streams in accordance with said determined synchronization word detection window.

2. The method of claim 1, further comprising the step of parallel shifting of said parallel boundary determination words through a register file.

3. The method of claim 2, wherein the step of parallel shifting said parallel boundary detection words includes the step of shifting said parallel boundary determination words from one synchronization word detection window to another synchronization word detection window.

4. The method of claim 1, wherein step (b) comprises applying said plurality of parallel boundary determination words to said synchronization word detectors as a single concatenated boundary determination word, said single concatenated boundary determination word being formed of said parallel boundary determination words joined to each other end-to-end.

5. The method of claim 4, wherein said parallel boundary determination words are provided with no serial shifting of bits within said parallel boundary determination words.

6. The method of claim 4, wherein said single concatenated boundary determination word is provided with no serial shifting within said single concatenated boundary determination word.

7. The method of claim 4, wherein said different portions of said single concatenated boundary determination word received by said respective synchronization word detection windows are shifted one bit with respect to at least one other portion.

8. The method of claim 7, wherein said synchronization word may occur in one of a predetermined number of different locations within said single concatenated boundary determination word and said synchronization word detection windows receive respective locations of said predetermined plurality of locations.

9. The method of claim 1 comprising the further steps of:

(e) simultaneously applying said plurality of parallel boundary determination words to multiplexer means and to said synchronization word detectors; and, (f) controlling said multiplexer means in accordance with said determined synchronization word detection window.

10. The method of claim 9, wherein step (f) comprises the step of selecting a transmitted word boundary by said multiplexer means from within said parallel boundary determination words.

11. The method of claim 10, wherein said selected transmitted word boundary differs from a boundary between said parallel boundary determination words.

12. The method of claim 1, wherein said synchronization word detection windows receive at least a portion of a plurality of said parallel boundary determination words.

13. A method for encoding a data stream formed of a plurality of data words and at least one synchronization bit pattern divisible into a first portion and a remaining portion in a data encoder of a network interface unit of a high-speed computer network, comprising the steps of:

(a) determining the absence of data words for forming said data stream by said data decoder;

(b) first inserting said first portion of said synchronization bit pattern into said data stream in response to the determination of step (a);

(c) determining that data words for forming said data stream are present after the inserting of step (b);

(e) storing at least a portion of a first data word of said determined data words;

(f) second inserting said remaining portion of said synchronization bit pattern into said at a stream after said first inserting;

(g) retrieving said first portion of said first data word; and, (h) third inserting said retrieved portion of said data word into said data stream.

* * * * *